Patented July 2, 1935

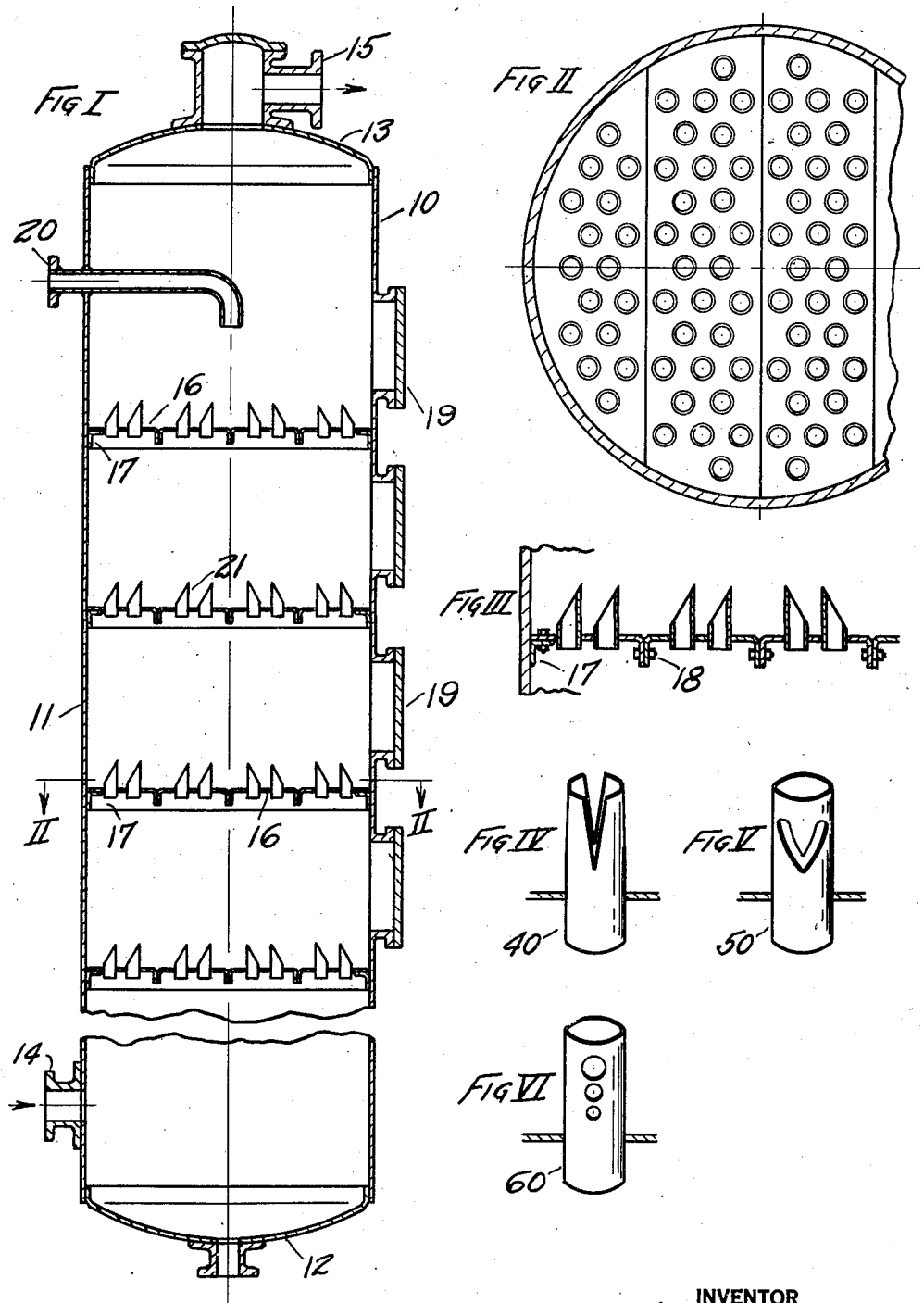

2,006,986

UNITED STATES PATENT OFFICE 2,006,986

FRACTIONATING TOWER

Luis de Florez, Pomfret, Conn.

Application May 28, 1932, Serial No. 614,125

4 Claims. (Cl. 261—114)

This invention relates to vapor and liquid contacting apparatus, and relates more particularly to apparatus for the fractionation of mixed vapors such as those obtained during the refining of petroleum. More specifically, the invention relates to improvements in fractionating towers of the type in which vapors to be fractionated are passed upwardly through the tower and cooled as they ascend, the heavier fractions being condensed and falling back toward the bottom of the tower, and the vapors of the lighter fractions passing out at the top of the tower.

It is an object of the present invention to provide a fractionating tower of simple, rugged and economical construction.

It is a further object of this invention to provide a fractionating tower which is of satisfactory efficiency and which maintains that efficiency substantially undiminished during long periods of operation under varying conditions.

A still further object of this invention is to provide a fractionating tower that permits the easy and rapid relief of sudden pressure rises during operation and hence is not readily liable to injury from such pressure changes.

Fractionating towers of the so-called bubble tower type are at present in wide use in the fractionation of petroleum. In this type of tower, a number of trays are usually provided, each of which is equipped with a large number of small chimneys or vapor risers covered by substantially hemispherical bubble caps. Liquid is maintained on the trays at a level above that of the bottom edges of the caps, which bottom edges are usually serrated, so that vapors rising through the vapor risers are forced to turn in their course and pass underneath the surface of the liquid, thus producing intimate contact of liquid and vapor. Separate liquid downflows are usually provided through which liquid descends from one tray to the next.

Bubble towers are very efficient fractionating devices, but possess several disadvantages. In the first place, the tortuous path of the vapors and the passage of the vapors through the liquid on the trays causes a high resistance to the flow of the vapors, and hence a high pressure drop through the tower. In the second place, bubble towers are structurally weak. Inequalities of operation often occur in petroleum refineries and particularly in the fractionation of vapors resulting from cracking processes. These inequalities of operation may be caused, for example, by sudden release of pressure in the cracking coil or by the sudden vaporization of small amounts of water when starting up, which water explosions, although accidental, are almost inevitable over a long period of operation. These sudden rises in pressure in the system often displace the trays and more often dislodge the caps from the risers, even though the bubble caps are fastened down over the risers as is usually the case. These dislocations of the trays and the bubble caps make the trays ineffective for the purpose intended and cause serious losses in operating efficiency. A third disadvantage is that bubble trays are very difficult to clean thoroughly.

My invention provides a tray that has lower resistance to vapor flow than a bubble tray while at the same time providing adequate contact for the purpose of fractionation, that is structurally much stronger than a bubble tray, and that may readily be cleaned. While the efficiency of fractionation is not quite that of the perfectly functioning bubble tower, the efficiency of operation is maintained substantially unchanged throughout long periods of operation, so that the tower is extremely dependable. This stability of operation compensates for the initial lower efficiency, and tests in connection with cracking plants have shown that fractionating towers constructed in accordance with my invention have on the average higher efficiency than bubble towers operated under similar conditions.

In general, a tower constructed in accordance with my invention comprises one or more fractionating trays in which a number of vertical conduits are secured. These conduits extend above the tray, and are higher at one part than at another. The conduits constitute direct passageways through the tray and are adapted to serve both as vapor risers and as liquid downflows. The conduits are preferably cylindrical, and may conveniently be made from short lengths of tubing. In a preferred embodiment of my invention, the upper ends of the conduits are cut at an acute angle to the vertical axis. It will be evident that vapors rising from below may pass freely through these conduits. The liquid that collects in the tray due to condensation or added reflux, will build up to the level of the lower edges of the conduits, and, as the level rises, the liquid will begin to flow down along one side of the conduits into the tray next below. The liquid and vapors come into contact as they flow in opposite directions through the conduits, in addition to which the liquid discharging from the conduits breaks up into a fine rain and intimately commingles with the rising vapors below the tray.

My invention will be more clearly understood by reference to the accompanying drawing, in which:

Figure I is a central vertical section, parts being shown in elevation, through a fractionating tower according to my invention.

Figure II is a horizontal section on the line II—II of Figure I.

Figure III is a detail view showing the construction of the conduits of Figure I.

Figures IV, V, and VI are perspective views of modified forms of conduits.

Referring more particularly to the drawing, the tower 10 as shown in Figure I comprises a cylindrical shell 11 closed by ends 12 and 13 and provided with an inlet 14 near the bottom and a vapor outlet 15 at the top. A number of horizontal trays 16 are secured to the shell 11 by means of brackets 17, shown more particularly in Figure III. The trays may conveniently be made in several sections as illustrated, the various sections being suitably secured together as shown at 18 in Figure III to form a complete tray. Manholes 19 are provided along the side of the tower to permit access to the trays for cleaning purposes. A line 20 near the top of the column permits the introduction of reflux liquid to the uppermost tray in the usual manner, if desired.

Each of the trays 16 is provided with a plurality of conduits 21. In the embodiment shown in Figures I to III, inclusive, these conduits comprise short lengths of cylindrical tubing mounted in corresponding apertures in the trays 16. The conduits 21 project above the trays 16 and have their tops cut off at an angle to the vertical axis. The cut-off angle is preferably a sharp or acute one, and may conveniently be 30 degrees with the vertical axis. The conduits 21 may be readily made of short lengths of tubing and may be a driving fit in the apertures in the trays 16.

It will be observed that with this construction of the conduits 21, the lower portions of the upper edge of the conduits act as lips over which liquid may overflow as the liquid level on the tray rises. As the liquid level rises, a larger proportion of the top edge of the conduit is available as such an overflow lip. The cut-off edges of the conduits 21, therefore, serves as weirs of varying height above the tray and also as weirs of increasing width as the level of the liquid on the tray rises. If the tops of the conduits 21 were level, there would be a tendency for the liquid to seal the tubes and for the rising vapors to flow through in surges, the tubes alternately flowing liquid downwardly or passing vapors upwardly. Or, on the other hand, some of the tubes might continuously flow liquid downwardly while others would continuously flow vapors upwardly, thus preventing adequate contact of the liquid and vapors. By making provision for the liquid to flow down one side of the tubes and the vapors to flow up along the other side of the tubes, these two actions are eliminated and a smooth operation results. The liquid flowing down along the low side of each of the conduits 21 tends to break up as it leaves the conduit into a fine rain or spray of liquid, which commingles intimately with the rising vapors. In order to obtain the maximum advantage from this liquid and vapor contact in the vapor space below each tray, I prefer to space my trays further apart than is customary in ordinary bubble tower practice.

It will be observed that the conduits 21 permit the direct vertical passage of vapors, and that there are no caps or baffles to cause the vapors to take a tortuous path through the tower. The tower is therefore open from the bottom to the top to the substantially verical passage of a column of fluid of a cross-sectional area corresponding to the total inside cross-sectional area of the conduits mounted in one of the trays 16. Ordinarily, of course, the trays 16 will have the same free area, but should this not be the case, the tower would still be open to the extent of the smallest free area of any of the trays. It will be observed from Figure I that the conduits 21 on adjacent trays are placed directly above one another. This is not necessary for proper operation of the tower, but is convenient for cleaning.

In the event that sudden increases of pressure take place in the system, due to water explosions or other causes, as discussed above, free upward flow of the vapors is permitted so that the pressure wave is dissipated. This results from the absence of caps or baffles and the fact that none of the tubes is sealed by liquid.

Although the theoretical efficiency of a tray of this construction is somewhat less than that of a properly designed and functioning bubble tray of equal size, the efficiency of my tray is maintained at substantially its theoretical value throughout the entire operation of my tower. In a bubble tower, on the other hand, a number of the caps may become displaced and even entire trays often cease functioning, due to accidental displacement or sagging or clogging. In actual operation under plant conditions, therefore, my fractionating tower compares very favorably with actual bubble tower efficiency, and, being more dependable, usually surpasses bubble tower performance over long periods of operation.

The extreme simplicity and economy of construction of my tower as compared to a bubble tower is apparent from the foregoing description and the accompanying drawing. Furthermore, it will be evident to those skilled in the art that my tower is not apt to be damaged by sudden increases of pressure. Moreover, the conduits 21 may be cleaned simply by thrusting a rod through them, access being permitted through the manholes 19.

Figures IV to VI, inclusive, show modified forms of conduits 40, 50, and 60, respectively, that may be substituted for the conduits 21. Each of the conduits shown in these figures is cylindrical in shape, in this respect resembling the conduits 21, but this shape is preferred merely for convenience and is not essential to the invention. It will be observed that in each of the conduits 40, 50, and 60, the effective top edge of the conduit is higher at some portions than at others, so that each conduit constitutes a weir of varying height above the tray. In each case, therefore, the area of the available liquid overflow space increases as the liquid level on the tray rises. In conduits 40, 50 and 60, the liquid overflow lips are so arranged that their available width increases as the liquid level rises. These three types of conduits, therefore, like conduits 21, constitute weirs of increasing width as the liquid level rises.

It will be evident that other modifications may be made in my invention without departing from the spirit thereof, and I desire to be limited, therefore, only by the prior art and the scope of the appended claims.

I claim:

1. Vapor and liquid contacting apparatus comprising a tray adapted to retain liquid, said tray being arranged so as to provide a vapor space of considerable height below said tray and a vapor space above said tray, and a plurality of tubular members vertically mounted in said tray and extending thereabove, said tubular members being substantially uniformly distributed over said tray and having their upper ends cut at an angle to the vertical axis thereof so as to form openings of narrow width at the bottom, said tubular members being adapted to serve both as vapor risers and as liquid downflows, said space of considerable height below the tray permitting the liquid which flows through said tubular members to fall in a rain formation whereby vapor, before rising through said tray, passes through and contacts the rain of liquid below the tray.

2. In a fractionating apparatus, in combination, a tower, a plurality of trays mounted in said tower at considerable distances apart, and a plurality of tubular members vertically mounted in each of said trays and distributed substantially uniformly over the entire surface thereof and constituting direct passageways therethrough, said tubular members extending above said trays and having their upper ends cut at an angle to the vertical axis thereof so as to form openings of narrow width at the bottom, said tubular members being adapted to serve both as vapor risers and as liquid downflows, said distance between the trays permitting the liquid which flows through said tubular members to fall in a rain formation whereby vapor rising through said tower passes through and contacts the rain of liquid below each tray.

3. In a fractionating apparatus, in combination, a tower, a plurality of trays mounted in said tower at considerable distances apart, and a plurality of tubular members vertically mounted in each of said trays and distributed substantially uniformly over the entire surface thereof and constituting direct passageways therethrough, said tubular members extending above said trays and having their upper ends cut at an angle to the vertical axis thereof so as to form openings of narrow width at the bottom, said tubular members being adapted to serve both as vapor risers and as liquid downflows, said distance between the trays permitting the liquid which flows through said tubular members to fall in a rain formation whereby vapor rising through said tower passes through and contacts the rain of liquid below each tray, said tower being open from the bottom to the top to the substantially vertical passage of a column of fluid of a cross-sectional area corresponding to the total inside cross-sectional area of the tubular members mounted in one of said trays, whereby occasional excessive vapor pressures may be promptly relieved.

4. Vapor and liquid contacting apparatus comprising a tray adapted to retain liquid, said tray being arranged so as to provide a vapor space of considerable height below said tray and a vapor space above said tray, and a plurality of conduits distributed substantially uniformly over the entire surface of said tray and vertically mounted therein, said conduits extending above said tray and constituting direct passageways from said lower vapor space to said upper vapor space, and said conduits having portions of their side walls removed to form liquid overflow lips constituting weirs of narrow width at the bottom and of increasing width as the level of the liquid on said tray rises, said space of considerable height below the tray permitting the liquid which flows through the weirs to fall in rain formation whereby vapor, before rising through said tray, passes through a rain of liquid below said tray.

LUIS DE FLOREZ.